(12) United States Patent
Bui et al.

(10) Patent No.: US 9,336,816 B1
(45) Date of Patent: *May 10, 2016

(54) DETERMINING ESTIMATED POSITION INFORMATION OF A MAGNETIC RECORDING TAPE USING MEDIA THICKNESS ESTIMATION

(71) Applicant: International Business Machines Corporation, Armonk, NY (US)

(72) Inventors: Nhan X. Bui, Tucson, AZ (US); Randy C. Inch, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,706

(22) Filed: Oct. 6, 2015

Related U.S. Application Data

(63) Continuation of application No. 14/675,564, filed on Mar. 31, 2015, now Pat. No. 9,183,874.

(51) Int. Cl.
*G11B 15/087* (2006.01)
*G11B 27/22* (2006.01)

(52) U.S. Cl.
CPC .............. *G11B 15/087* (2013.01); *G11B 27/22* (2013.01)

(58) Field of Classification Search
None
See application file for complete search history.

(56) References Cited

U.S. PATENT DOCUMENTS

| 4,217,615 | A | 8/1980 | Suzuki |
| 4,352,472 | A | 10/1982 | Tyrsted |
| 5,245,485 | A | 9/1993 | Dunn et al. |
| 5,742,730 | A | 4/1998 | Couts et al. |
| 6,188,536 | B1 | 2/2001 | Chliwnyi |
| 6,565,029 | B2 | 5/2003 | Zweighaft et al. |
| 6,603,626 | B1 | 8/2003 | Takayama |
| 6,624,961 | B1 | 9/2003 | Takayama |
| 6,754,026 | B1 | 6/2004 | Koski |
| 6,865,047 | B2 | 3/2005 | Maekawa et al. |
| 7,499,628 | B2 | 3/2009 | Yuen et al. |
| 8,213,105 | B2 | 7/2012 | Bui et al. |
| 8,767,335 | B2 | 7/2014 | Hancock et al. |
| 9,183,874 | B1 | 11/2015 | Bui et al. |
| 2015/0002958 | A1 | 1/2015 | Altknecht et al. |

OTHER PUBLICATIONS

Bui et al., U.S. Appl. No. 14/675,564, filed Mar. 31, 2015.
Compuphase, "Reel quantity estimate," Retrieved from website http://www.compuphase.com/electronics/reelestimate.htm, Jul. 2014, pp. 1-2.
List of IBM Patents or Patent Applications Treated as Related.

*Primary Examiner* — Wayne Young
*Assistant Examiner* — James L Habermehl
(74) *Attorney, Agent, or Firm* — Zilka-Kotab, PC

(57) ABSTRACT

In one embodiment, a method includes acquiring, by the computer, position information from encoding on a magnetic medium, causing, by the computer, a reel around which the magnetic medium is wrapped to rotate a number of rotations, calculating, by the computer, an estimated thickness of the magnetic medium based on the position information, the number of rotations, and a pack radius of the magnetic medium on the reel, and causing to be stored, by the computer, the estimated thickness. In another embodiment, an apparatus includes a controller and logic integrated with and/ or executable by the controller, the logic being configured to cause the controller to perform the foregoing method.

19 Claims, 9 Drawing Sheets

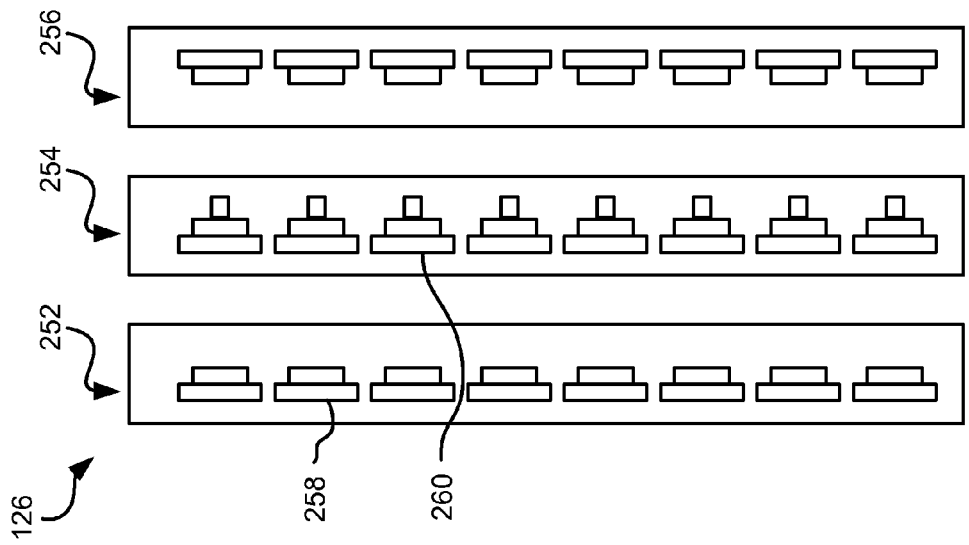
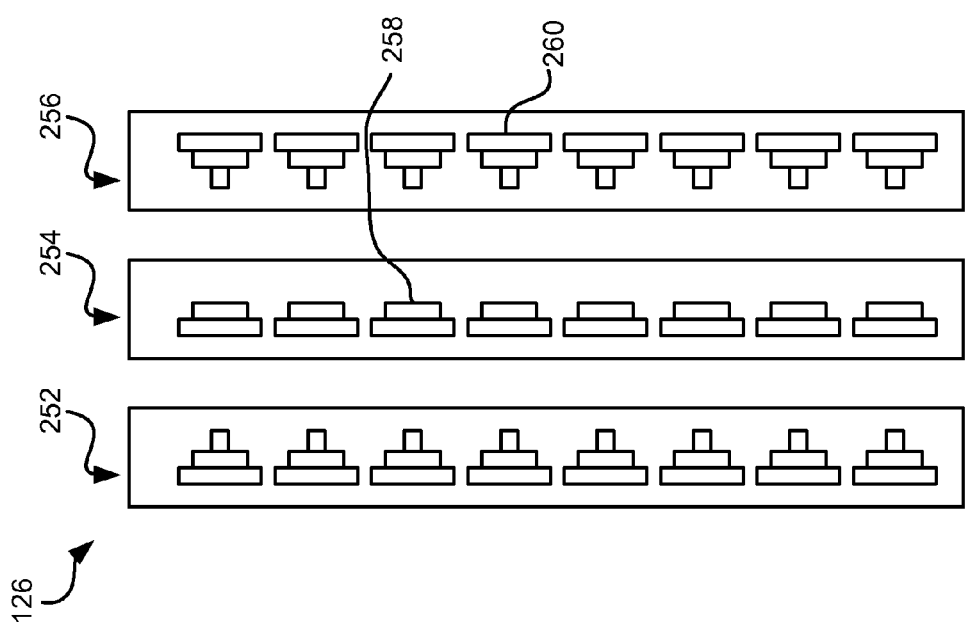

DETERMINING ESTIMATED POSITION INFORMATION OF A MAGNETIC RECORDING TAPE USING MEDIA THICKNESS ESTIMATION

BACKGROUND

The present invention relates to data storage systems, and more particularly, this invention relates to determining estimated position of information on a magnetic recording tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

In one embodiment, computer program product for estimating media thickness includes a computer readable storage medium having program instructions embodied therewith, the program instructions executable by a controller to cause the controller to perform a method including acquiring, by the controller, actual position information from encoding on a magnetic medium, calculating, by the controller, estimated position information of the magnetic medium using a media thickness value, comparing, by the controller, the estimated position information with the position information acquired from encoding, determining whether an error between the estimated position information and the acquired position information is within a specified range. In response to determining that the error is within the specified range, the media thickness value is stored, by the controller, to a memory. In response to determining that the error is outside the specified range, the media thickness value is changed by the controller.

In another embodiment, a computer-implemented method, e.g., performed by a controller, includes, acquiring, by the computer, position information from encoding on a magnetic medium, causing, by the computer, a reel around which the magnetic medium is wrapped to rotate a number of rotations, calculating, by the computer, an estimated thickness of the magnetic medium based on the position information, the number of rotations, and a pack radius of the magnetic medium on the reel, and causing to be stored, by the computer, the estimated thickness.

In another embodiment, an apparatus includes a controller and logic integrated with and/or executable by the controller, the logic being configured to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

Various embodiments described herein may be used to accurately estimate position information of magnetic recording tape in a magnetic storage system e.g. such as a tape drive system. Estimating accurate position information of a tape drive for example may be based on the radius of the tape media on a reel which is dependent on the thickness of the tape, and changes over time as the reel spools.

In one general embodiment, a method includes acquiring actual position information from encoding on a magnetic medium, calculating estimated position information of the magnetic medium using a media thickness value, comparing the estimated position information with the position information acquired from encoding, determining whether an error between the estimated position information and the acquired position information is within a specified range, in response to determining that the error is within the specified range, storing the media thickness value to a memory, and in response to determining that the error is outside the specified range, changing the media thickness value.

In another general embodiment, an apparatus includes a controller and logic integrated with and/or executable by the controller, the logic being configured to cause the controller to perform the foregoing method.

In another general embodiment, a computer program product for estimating media thickness includes a computer readable storage medium having program instructions embodied therewith, the program instructions executable by a controller to cause the controller to perform a method including, acquiring, by the controller, position information from encoding on a magnetic medium, causing, by the controller, a reel around which the magnetic medium is wrapped to rotate a number of rotations, calculating, by the controller, an estimated thickness of the magnetic medium based on the position information, the number of rotations, and a pack radius of the magnetic medium on the reel, and causing to be stored, by the controller, the estimated thickness.

Figure 1A:
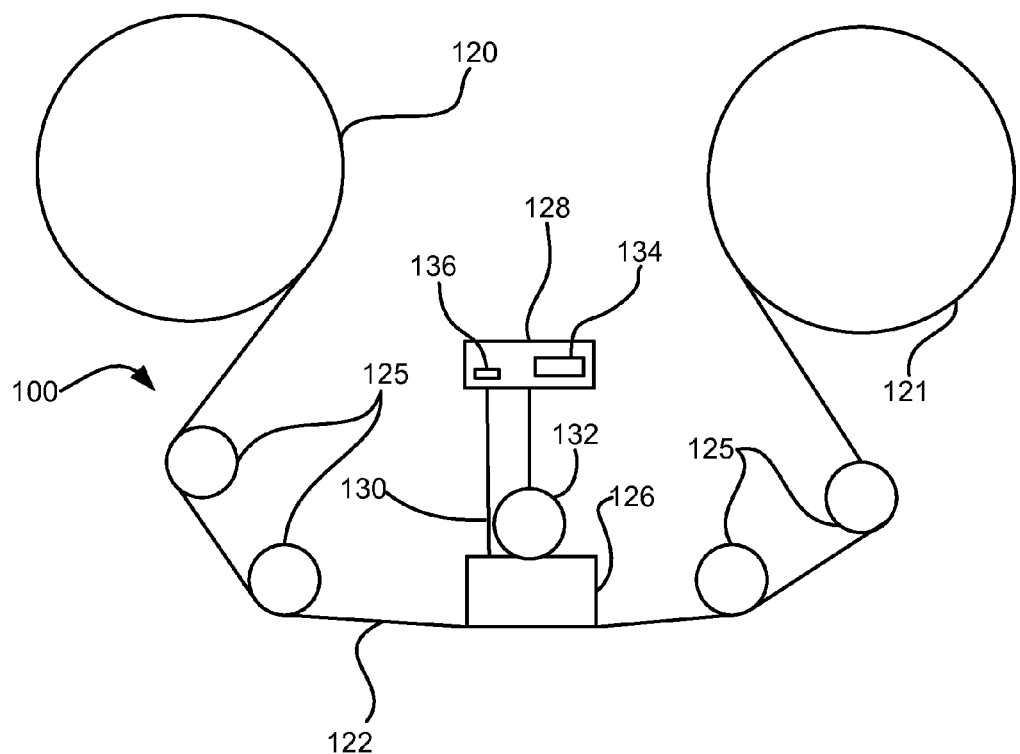
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
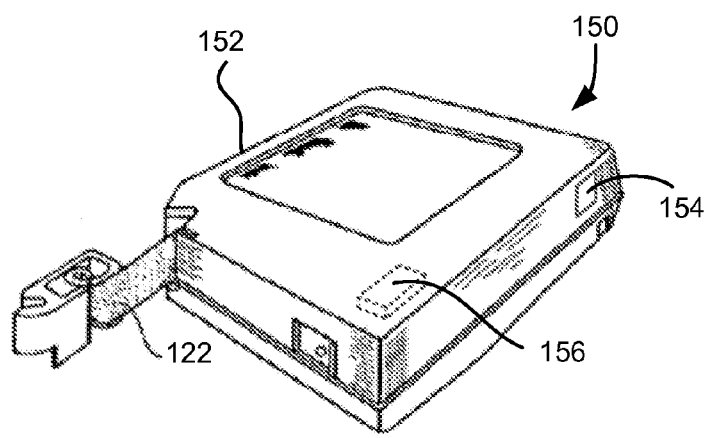
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
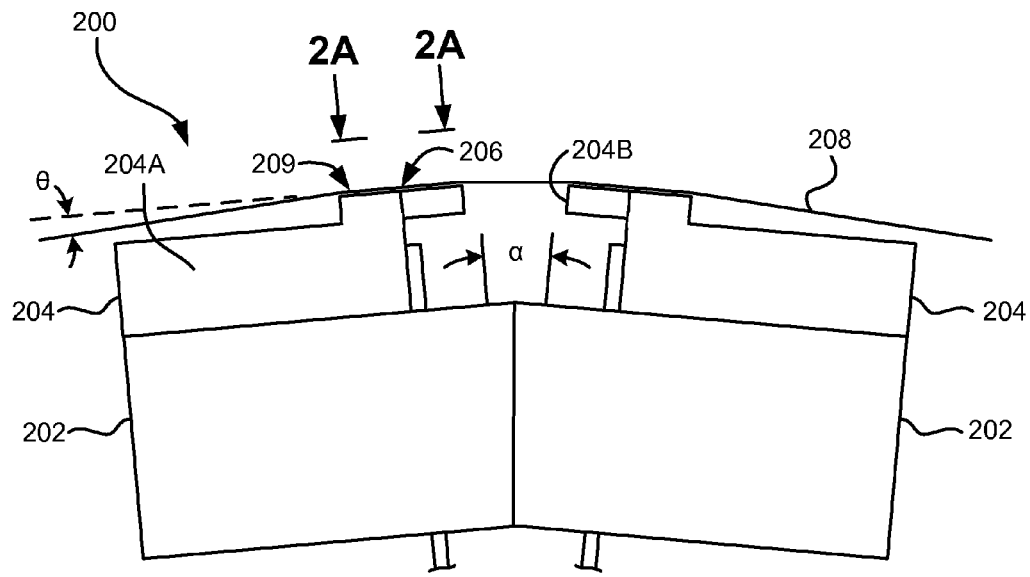
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
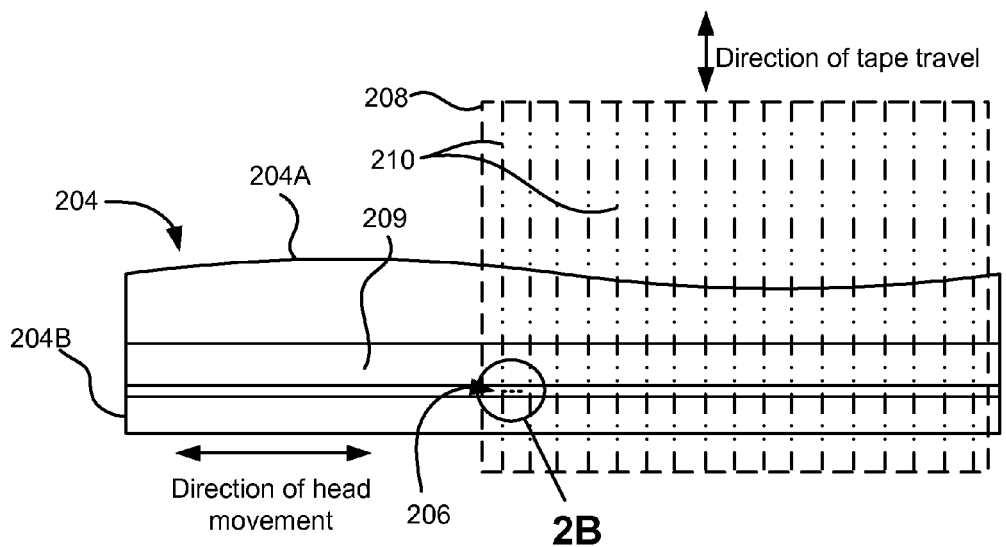
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
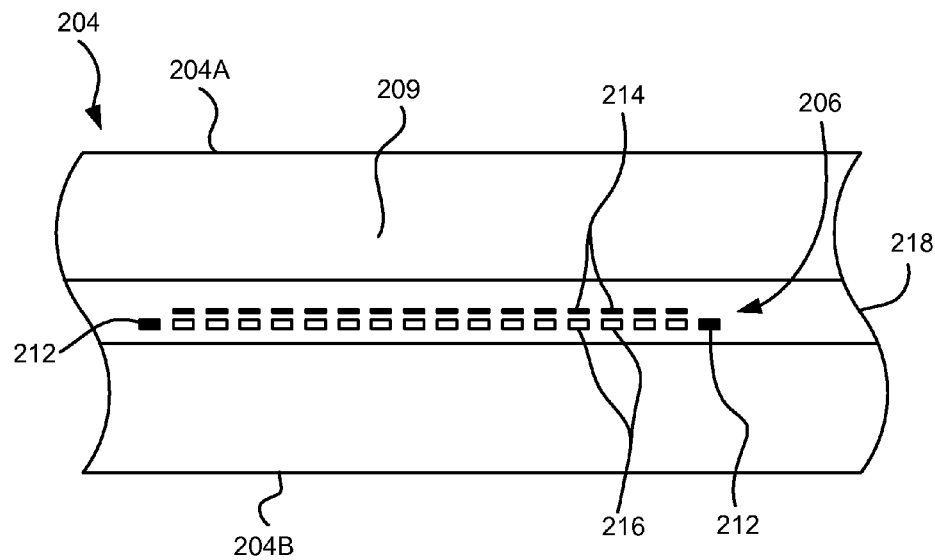
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
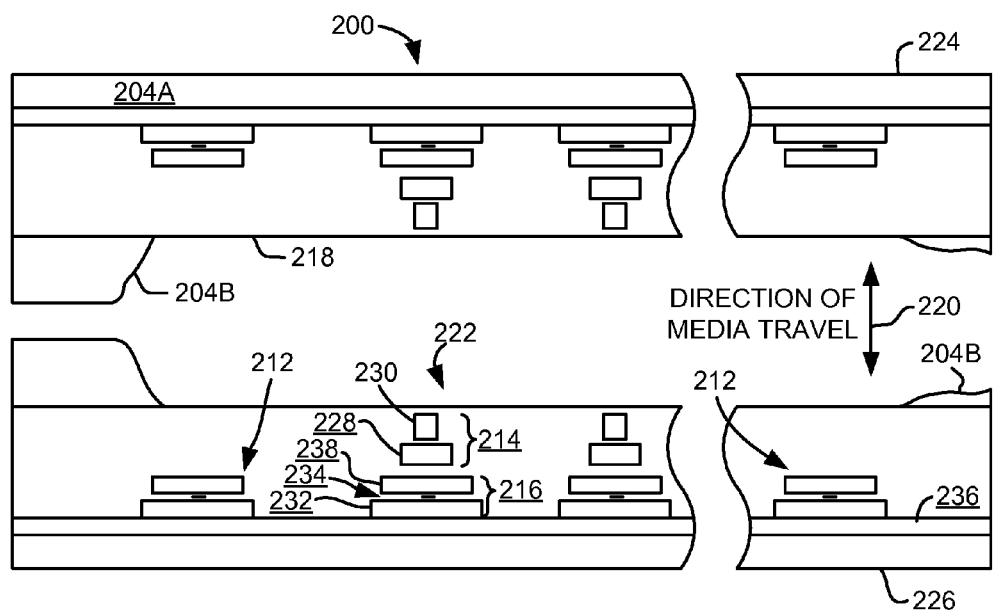
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
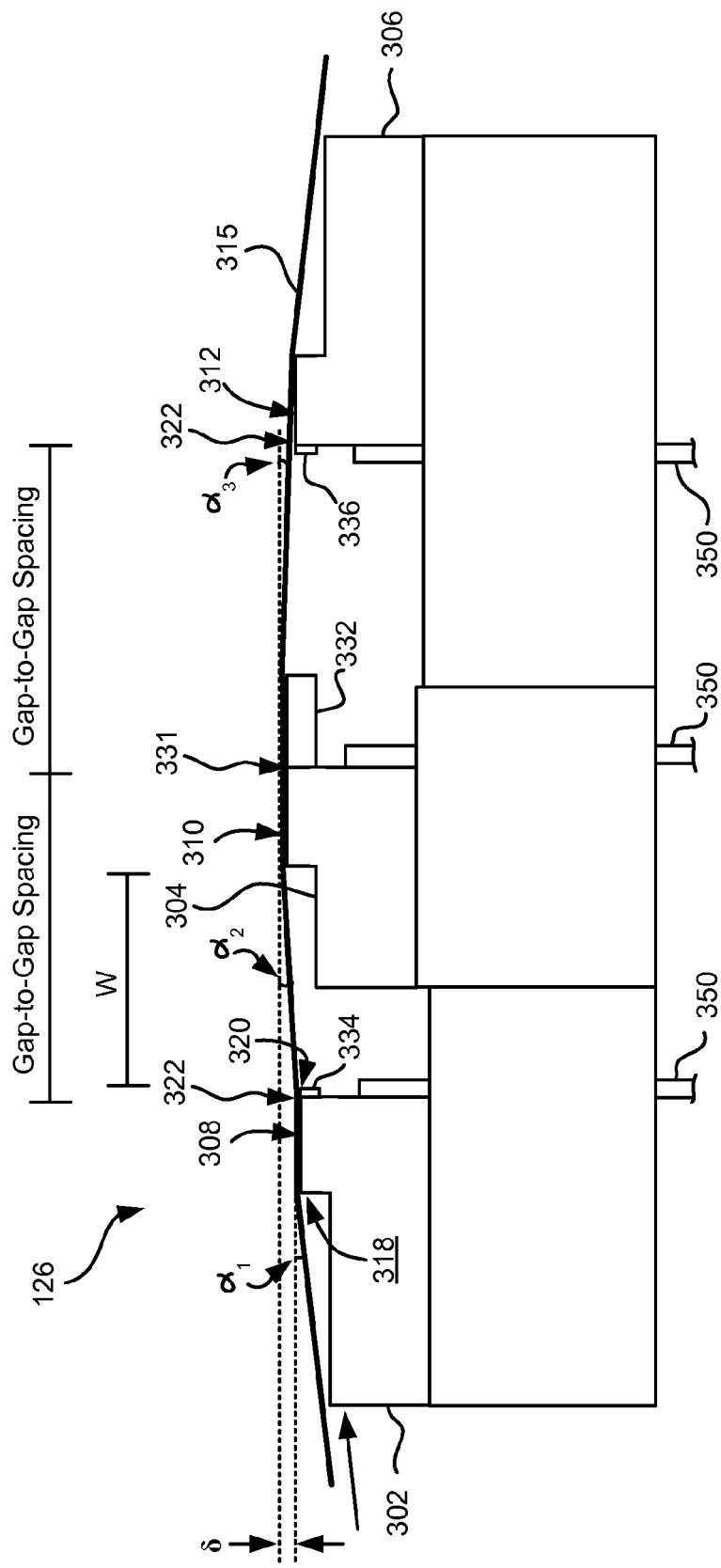
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
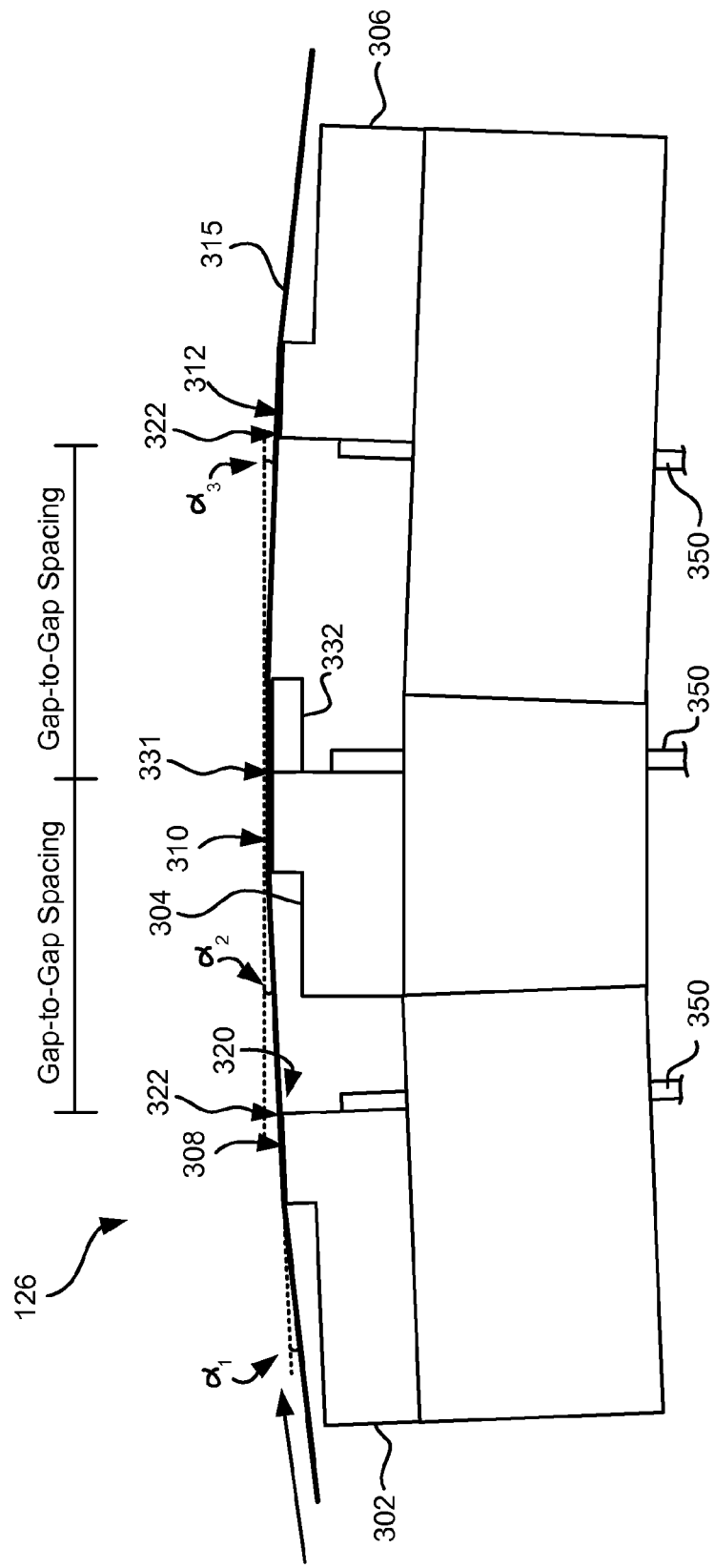
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Linear Tape Open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for writeread-write applications. Additional aspects of these embodiments are similar to those given above.

Typically, the tape wrap angles may be set about midway between the embodiments shown in FIGS. 5 and 6.

Figure 7:
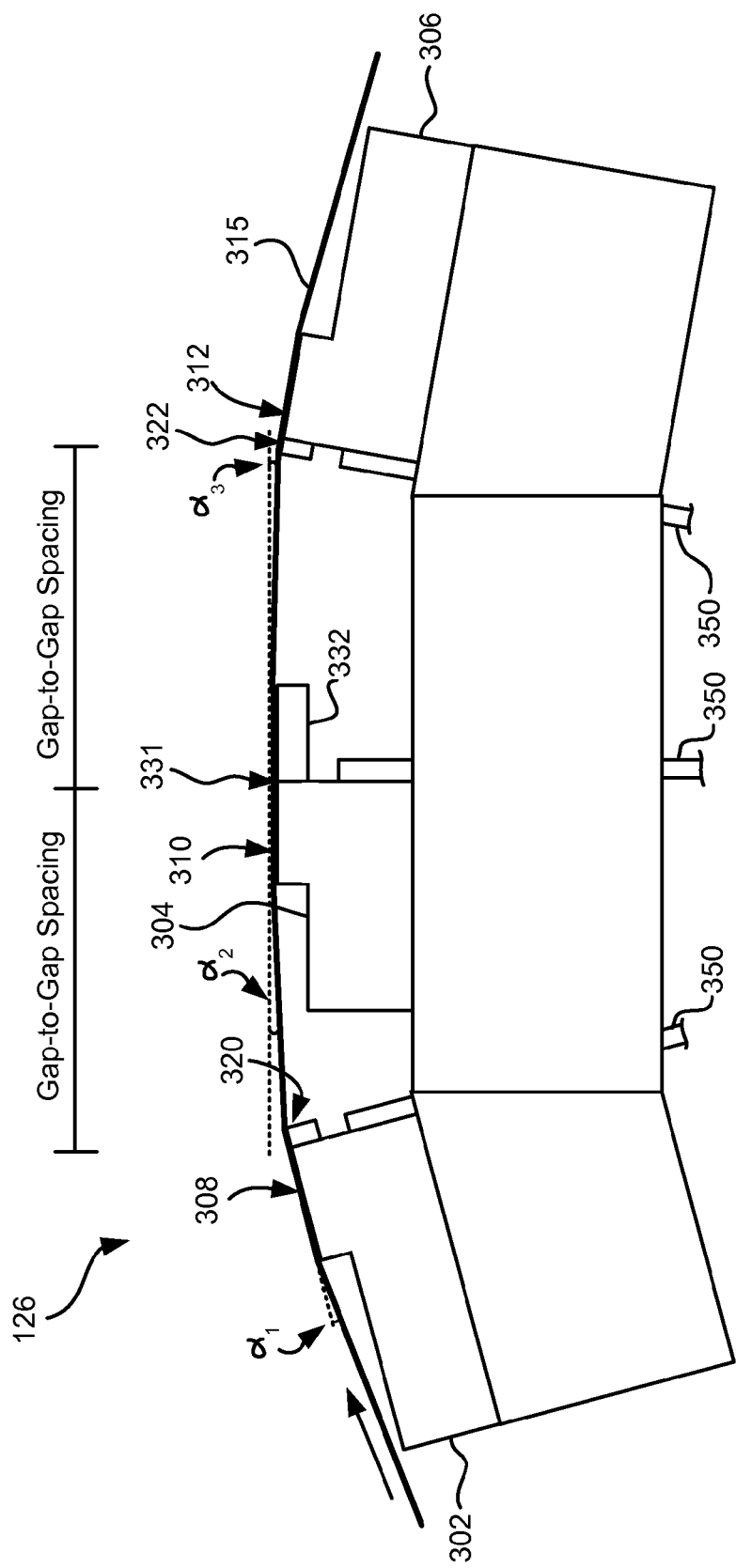
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

It may be useful to estimate a linear position along a tape for a variety of reasons. LTO technology, for example, uses linear position information encoded in servo tracks on the tape to enable an exact location determination. However, during high speed seek operations, locking onto the servo track may not be possible. For example, the tape velocity may be higher than a velocity at which the servo channel can accurately process the linear position information. In such case, it may be necessary to use an estimator to estimate the linear position of the tape.

Use of a default thickness for tape when estimating positional information may be problematic because this default thickness may have a tolerance associated therewith. The longer the tape in a single cartridge, the more a deviance in tape thickness from the design thickness affects estimation of tape position, even though the tape thickness may be within the proper tolerance. For example, if the actual tape thickness is different than the default thickness, any estimate based thereon will be inaccurate, and such inaccuracy is compounded the longer the tape, and thus, the more wraps on the reel. Upon advancing to the end of the tape reel, the linear tape position may be inaccurate by tens of meters, etc., due to the integration of the tape thickness deviation over a distance of tape advancement. Due to this inaccuracy, and in an effort to prevent reel run off, high speed seek operations may be prohibited when the seek location resides near/at the beginning or end portion of the tape. These outer portions may serve as a safety buffer e.g. where LPOS may be used to find the seek location to prevent reel run off due to an inaccurate linear tape position.

Various embodiments described herein acquire an accurate estimate of media thickness, which in turn enables calculation of accurate positional information, e.g., linear tape position, without reading linear position information encoded on the tape during a seek operation.

Figure 8:
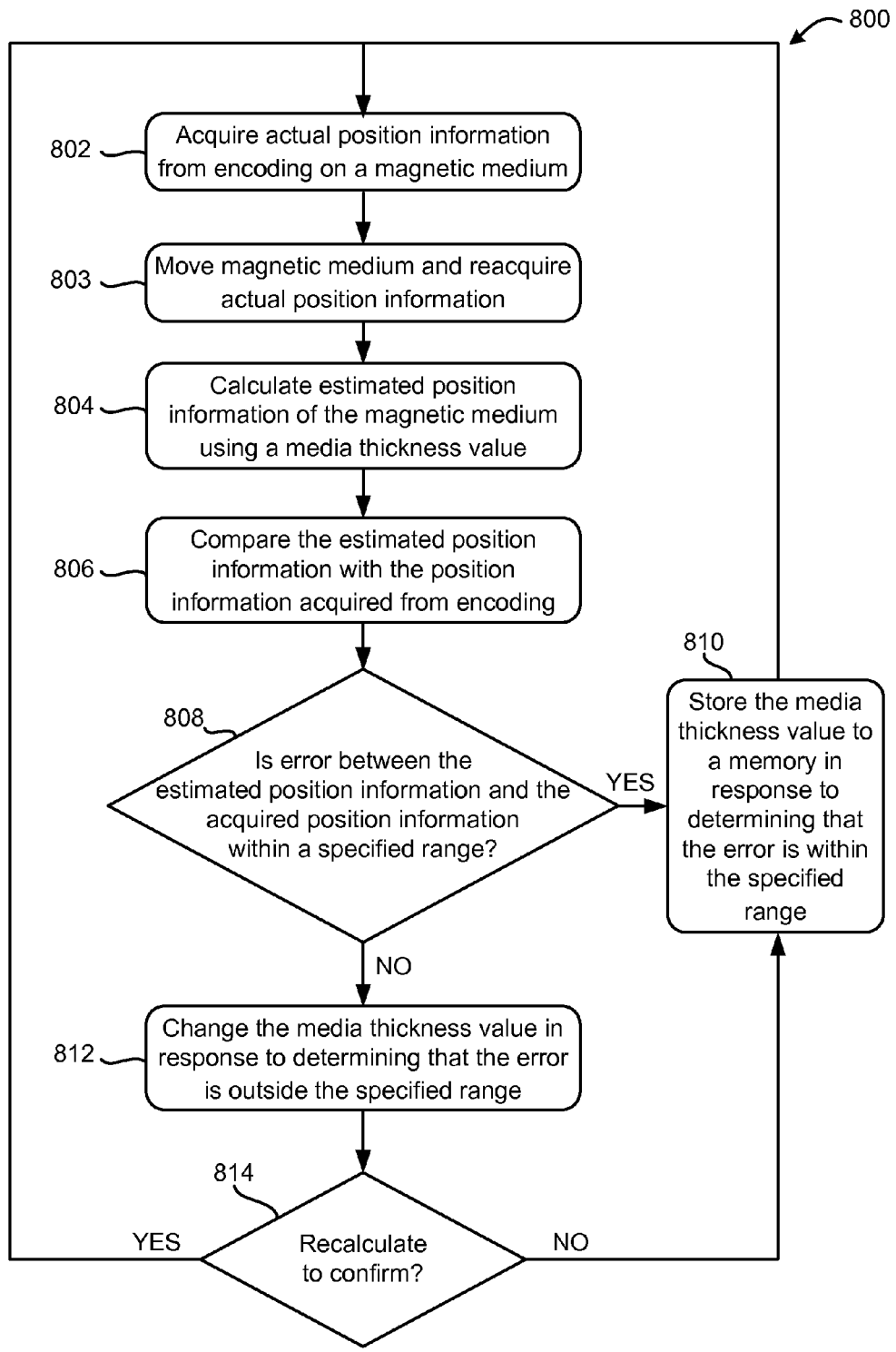
FIG. 8 is a flowchart of a method in accordance with one embodiment.

Now referring to FIG. 8, a flowchart of a method 800 is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a tape drive as in FIG. 1, or some other device having one or more controllers therein. The controllers, e.g., processing circuit(s), chip(s), and/or module(s) implemented in hardware and/or software, and preferably having at least one hardware component may be utilized in any device to perform one or more steps of the method 800. Illustrative controllers include, but are not limited to, a central processing unit (CPU), an application specific integrated circuit (ASIC), a field programmable gate array (FPGA), etc., combinations thereof, or any other suitable computing device known in the art.

In order to test the accuracy of a tape thickness, actual position information may be acquired from encoding on a magnetic medium at a location on tape. Acquiring the actual position information from encoding on a magnetic medium may be done e.g., using techniques known in the art, such as LTO LPOS processing whereby the linear position on tape is obtained from information encoded in one or more servo tracks on the tape. Accordingly, in operation 802, actual position information is acquired from encoding on a magnetic medium. The magnetic medium may be a magnetic recording tape, as will be described in various embodiments herein.

The tape may then be advanced or rewound a distance to a tape location where additional actual position information may be acquired and then compared to an estimated position information (calculated using a stored media thickness), in order to determine the accuracy of and/or recalibrate when necessary the stored and/or estimated media thickness, as will be described herein. In operation 803, actual position information is again acquired, this time at the location reached after advancing or rewinding from the location where the above described actual position information was acquired. As described above, the actual position information may be acquired from a servo track on the magnetic medium. Acquiring the actual position information from encoding on a magnetic medium may be done e.g., using techniques known in the art, such as LTO LPOS processing.

In operation 804, estimated position information of the magnetic medium is calculated using a media thickness value. The media thickness value used in an initial estimated position calculation may be a pre-stored value, a default value, etc., depending on the preferred embodiment. According to various approaches, the estimated position information of the magnetic medium may be determined (e.g., calculated) using any known method of estimating positional information for a magnetic medium. Specific examples of processes which may be used to determine the estimated position information of the magnetic medium may include reel radius ratio, LPOS interpolation, hall counts per revolution, etc.

According to one embodiment, the estimated position information may be calculated using e.g. hall counts, optical sensor tape reel revolution or motor revolution information, using a technique of a type known in the art, etc. in combination with the estimated tape thickness.

This estimated position information may then be compared to the position information acquired from encoding in order to determine the accuracy of the stored media thickness value. Accordingly, in operation 806, the estimated position information is compared with the position information acquired from encoding. The comparison between the estimated position information and the position information acquired from encoding may be performed e.g. by a controller, using comparator logic, by a comparison of a type known in the art, etc. Comparing the estimated position information (e.g. which may be calculated using the stored media thickness) with the position information acquired from encoding enables verification of whether or not the stored media thickness value is calibrated within an acceptable error margin. See decision 808 below.

In determination 808, it is determined whether the error between the estimated position information and the acquired position information is within a specified range (e.g. a tolerance range, an acceptable error margin range, etc.). Additionally, it may be determined whether the error between the estimated position information and the acquired position information is outside of a specified range (e.g. a tolerance range, an acceptable error margin range, etc.). Preferred responses to these determinations are described below.

In operation 810, the media thickness value is stored to a memory in response to determining that the error is within the specified range (noted by the 'YES' logic leading from decision 808). The memory to which the media thickness value is stored may be e.g. the cartridge memory, a memory of the drive, in RAM, on a host, in a library controller, etc. According to one embodiment, the media thickness value may be stored to a cartridge memory coupled to the magnetic recording medium. Because media thicknesses along the length thereof typically do not vary much, this thickness value may be stored for the entire media. According to further embodiments e.g. where a medium may include varying thicknesses at different points therealong, numerous media thicknesses may be stored for various locations on the media.

According to one embodiment, a seek operation may be performed using the stored media thickness value. For example, the now-calibrated media thickness value may be used to estimate a linear position of the tape using any known estimation method.

Knowing within an acceptable error margin where the media on a reel ends may prove especially advantageous because e.g. it may allow high speed location seeks to the end portions of a tape (e.g. locations that would be otherwise not be advanced to at high speeds as a precaution for tape reel run off due to an incorrectly determined end of tape location, etc.), it may prevent costly maintenance that would be needed due to a tape reel run off event, it may prevent a tape drive (e.g. tape drive system of FIG. 1) from having to slow tape travel until very close to the end of a tape (e.g. due to not knowing the end of tape location within an acceptable error margin, etc.), etc.

Furthermore, knowing within an acceptable error margin where the location of a tape ends may reduce the linear position estimation error margin to about 0.3-0.7 meters, according to one embodiment. In the context of high speed seeks, this may provide an additional substantial amount of high speed seek locations (e.g. due to the high speed seek locations previously residing within a potentially incorrectly determined end of tape location) along both the beginning and end portions of a tape.

In operation 812, the media thickness value is changed in response to determining that the error is outside the specified range (noted by the 'NO' logic leading from decision 808). According to one embodiment, the media thickness value may be changed to make the estimated position information fall within of the specified range.

Changing the media thickness value in response to determining that the error is outside the specified range may be very important with respect to maintaining accurate media position information. This may be because for example, storing a media thickness value that is outside of the specified error range may be compounded the longer the length of tape on a tape reel there is. This may then lead to numerous problems e.g. tape reel run off during tape travel due to an incorrectly determined end of tape location, passing a desired media location and having to backtrack due to incorrectly determined position information, increased the overall time of seek functions, etc.

According to one embodiment, the media thickness value may be changed so that the calculated estimated position information, e.g., using the procedure of operation 804, about matches the actual position information. For example, a reverse calculation may be performed to derive a better estimate of the thickness value.

According to another embodiment, the media thickness value may be sequentially changed by an incremental amount until the estimated position information is within an acceptable error range. Moreover, the media thickness value may be further incremented, e.g. even after finding a media thickness within an acceptable error range in order to find a more acceptable media thickness.

In response to determining that the error is outside the specified range, actual position information may be reacquired, the estimated position information may be recalculated using the changed media thickness value, and the comparing and determining may be repeated. An exemplary embodiment of this response is detailed below.

According to one embodiment, the media thickness value may be re-assessed e.g. by operations 802-806 and determination 808 in response to occurrence or presence of a trigger condition, e.g. the specified error range between the estimated position information and the acquired position information changing, a user requiring a series of media thickness testing sequences, the media thickness value potentially changing due to environmental constraints (e.g. tape stretching, temperature changes, etc.), etc.

According to one embodiment, the media thickness value may be sequentially changed by an incremental amount, and the media thickness value may be re-assessed e.g. by operations 802-806 and determination 808 until the specified error range between the estimated position information and the acquired position information are within an acceptable error range.

In determination 814, it is determined if the error between the estimated position information and the acquired position information should be recalculated (e.g. by operations and determinations of method 800) to confirm that they are within the specified range. A recalculation may be performed in response to the media thickness being changed (e.g. in response to determining that the error is outside the specified range, etc.).

In response to determining that the error between the estimated position information and the acquired position information should be recalculated to confirm that they are within the specified range, portions of method 800 may be again performed e.g. as noted by the 'YES' logic leading from decision 814.

In response to determining that the error between the estimated position information and the acquired position information should not be recalculated to confirm that they are within the specified range, the media thickness value may be stored to a memory (noted by the 'NO' logic leading from decision 814).

For example, once a media thickness is found to be within an acceptable error margin, the estimated media thickness value may be incrementally increased and/or decreased and then re-assessed e.g. by operations 802-806 and determination 808 in order to find an even more accurate media thickness. In response to incrementally increasing and/or decreasing the estimated thickness value and finding a less accurate estimated media thickness value, the most accurate (e.g. accurate within an acceptable error range) previously determined media thickness value may be preferably stored in memory as the media thickness value.

A further embodiment of calculating a media thickness will now be described by method 900.

Figure 9:
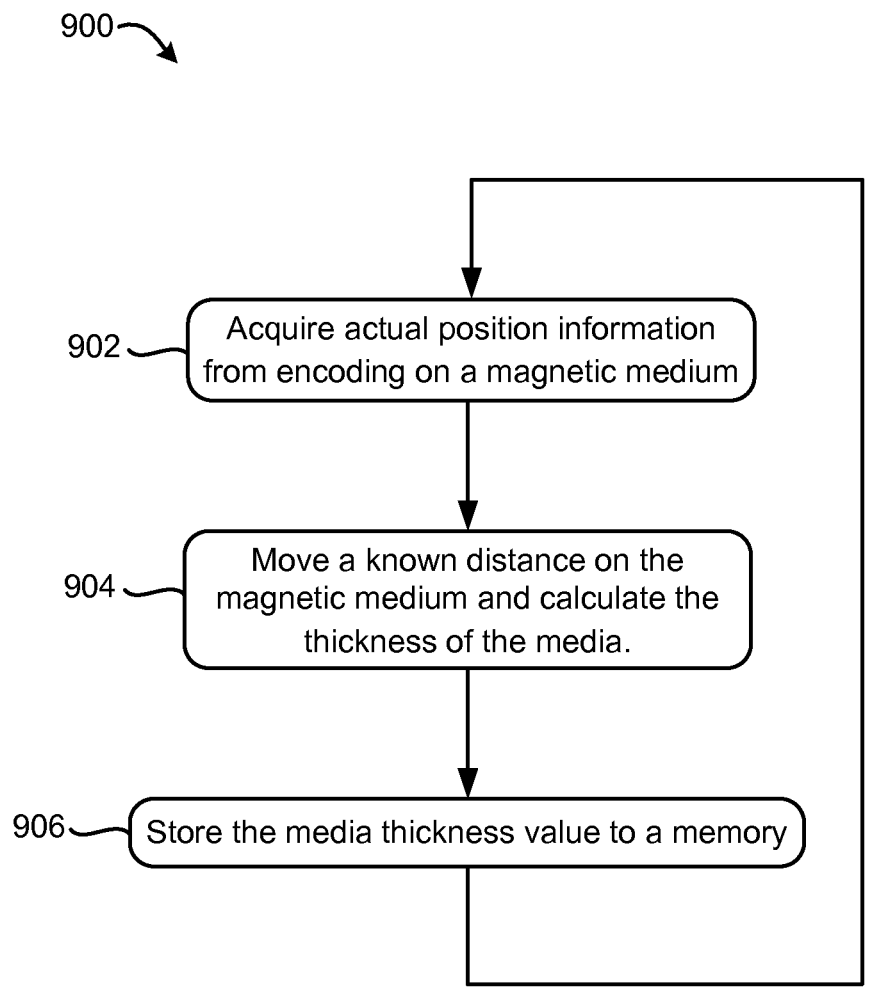
FIG. 9 is a flowchart of a method in accordance with one embodiment.

Now referring to FIG. 9, a flowchart of a method 900 is shown according to one embodiment. The method 900 may be performed in accordance with the present invention in any of the environments depicted in FIGS. 1-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a tape drive as in FIG. 1, or some other device having one or more controllers therein. The controllers, e.g., processing circuit(s), chip(s), and/or module(s) implemented in hardware and/or software, and preferably having at least one hardware component may be utilized in any device to perform one or more steps of the method 900. Illustrative controllers include, but are not limited to, a CPU, an ASIC, a FPGA, etc., combinations thereof, or any other suitable computing device known in the art.

Similar to operation 802 of method 800, in operation 902, actual position information is acquired from encoding on a magnetic medium.

In operation 904, the magnetic medium is then moved (e.g. advanced or rewound) by a distance, and an estimated thickness of the medium is calculated. As in method 800, moving a known distance on the magnetic media may be then calibrated with the media reel (e.g. tape reel) to calibrate a corresponding media thickness value. An illustrative embodiment for calculating the thickness of the media is described below.

According to one embodiment, the estimated media thickness (e.g. tape thickness in the present example) of the magnetic medium may be found using the following formula:

$$T = (P-E)/W \qquad \text{Formula (1)}$$

In Formula (1) the tape thickness 'T' may be calculated by calculating the pack radius 'P' e.g. the current radius of tape on one of the reels. The pack radius 'P' may be calculated by calibrating the linear position of the tape (e.g. acquired in operation 902) with the number of tape reel rotations performed in moving the tape a known distance from the location at which the actual position information is acquired. The radius of the empty reel 'E' to which the tape is wrapped may then be subtracted from the pack radius 'P' to calculate the radial tape thickness on the tape reel e.g. '(P-E)'. The tape thickness ('T') may then be calculated by dividing the radial tape thickness '(P-E)' on the tape reel by the number of tape wraps 'W' on the tape reel.

In operation 906, the media thickness value (e.g. tape thickness 'T' in the above example, etc.) is stored to a memory. Similar to the procedure indicated in operation 810 of method 800, the memory to which the media thickness value is stored may be e.g. the cartridge memory, in the drive, in RAM, etc. According to one embodiment, the media thickness value may be stored to a cartridge memory coupled to the magnetic recording medium. In response to the actual position information of the media becoming not readily available e.g. such as during high speed locates, etc., the media thickness value may be used in order to calculate a linear tape position when calibrated with e.g. tape reel rotations, measured tape advancement past a previous actual position, etc.

In response to determining that the media thickness value should be e.g. further recalculated, calculated by performing method 900 a series of times, recalculated due to environmental constraints (e.g. tape stretching, temperature changes, etc.), etc., method 900 may be again performed.

Furthermore, the estimated media thickness value calculated according to any of the embodiments described herein may be used to estimate a linear position of the tape using any known estimation method.

With the estimated media thickness value determined using any of the foregoing methodology, and optionally stored in memory, the drive may then perform some action using the estimated media thickness value, such as perform a seek function (e.g. where the position information of the seek function is based on the stored thickness value, etc.), perform further iterations of testing of the stored media thickness value, perform high speed seek functions to the outermost portions of a tape in a tape drive, etc.

When a tape is mounted to a drive, and some action is to be performed using an estimated tape thickness, the drive may first determine whether a thickness value is stored in memory, e.g., cartridge memory, and if so, whether the thickness value is a previously calculated tape thickness or a default/pre-set tape thickness. Where the stored thickness value has been previously calculated, the action can be performed. Where the stored thickness value is nonexistent, or is a default/pre-set tape thickness, the foregoing methodology may be performed to create an accurate estimate of the thickness value, which in turn can be stored in memory and/or used in the desired action.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for estimating media thickness, the computer program product comprising a computer readable storage medium having program instructions embodied therewith, the program instructions executable by a controller to cause the controller to perform a method comprising:
    acquiring, by the controller, actual position information from encoding on a magnetic medium;
    calculating, by the controller, estimated position information of the magnetic medium using a media thickness value;
    comparing, by the controller, the estimated position information with the position information acquired from encoding;
    determining, by the controller, whether an error between the estimated position information and the acquired position information is within a specified range;
    in response to determining that the error is within the specified range, storing, by the controller, the media thickness value to a memory; and
    in response to determining that the error is outside the specified range, changing, by the controller, the media thickness value.

2. A computer program product as recited in claim 1, wherein the actual position information is acquired from a servo track on the magnetic medium.

3. A computer program product as recited in claim 1, wherein the media thickness value is changed to make the estimated position information fall within of the specified range.

4. A computer program product as recited in claim 1, comprising program instructions executable by a controller to cause the controller to, in response to determining that the error is outside the specified range, reacquire actual position information, recalculate the estimated position information using the changed media thickness value, and repeat the comparing and determining.

5. A computer program product as recited in claim 1, wherein the media thickness value is stored to a cartridge memory coupled to the magnetic medium.

6. A computer program product as recited in claim 1, wherein the magnetic medium is a magnetic recording tape.

7. A computer program product as recited in claim 1, comprising program instructions executable by a controller to cause the controller to perform a seek operation using the stored media thickness value.

8. An apparatus, comprising:
    a controller and logic integrated with and/or executable by the controller, the logic being configured to cause the controller to:
        acquire, by the controller, position information from encoding on a magnetic medium;
        cause, by the controller, a reel around which the magnetic medium is wrapped to rotate a number of rotations;
        calculate, by the controller, an estimated thickness of the magnetic medium based on the position information, the number of rotations, and a pack radius of the magnetic medium on the reel; and
        cause to be stored, by the controller, the estimated thickness.

9. An apparatus as recited in claim 8, wherein the position information is acquired from a servo track on the magnetic medium.

10. An apparatus as recited in claim 8, wherein the estimated thickness is stored to a cartridge memory coupled to the magnetic medium.

11. An apparatus as recited in claim 8, wherein the media thickness value is stored to a cartridge memory coupled to the magnetic medium.

12. An apparatus as recited in claim 8, wherein the magnetic medium is a magnetic recording tape.

13. An apparatus as recited in claim 8, comprising logic configured to cause the controller to perform a seek operation using the stored media thickness value.

14. An apparatus as recited in claim 8, comprising:
    a drive mechanism for passing a magnetic medium over a magnetic head,
    the controller being electrically coupled to the magnetic head and the drive mechanism.

15. A computer-implemented method, comprising:
    acquiring, by the computer, position information from encoding on a magnetic medium;
    causing, by the computer, a reel around which the magnetic medium is wrapped to rotate a number of rotations;
    calculating, by the computer, an estimated thickness of the magnetic medium based on the position information, the number of rotations, and a pack radius of the magnetic medium on the reel; and
    causing to be stored, by the computer, the estimated thickness.

16. A method as recited in claim 15, wherein the position information is acquired from a servo track on the magnetic medium.

17. A method as recited in claim 15, comprising storing the estimated thickness to a cartridge memory coupled to the magnetic medium.

18. A method as recited in claim 15, wherein the magnetic medium is a magnetic recording tape.

19. A method as recited in claim 15, comprising performing a seek operation using the stored estimated thickness.

* * * * *